US006411752B1

United States Patent
Little et al.

(10) Patent No.: US 6,411,752 B1
(45) Date of Patent: Jun. 25, 2002

(54) VERTICALLY COUPLED OPTICAL RESONATOR DEVICES OVER A CROSS-GRID WAVEGUIDE ARCHITECTURE

(75) Inventors: Brent E. Little, Greenbelt, MD (US); Wugen Pan, Atsugi; Yasuo Kokubun, Yokohama, both of (JP); Sai T. Chu, Greenbelt, MD (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/510,432

(22) Filed: Feb. 22, 2000

Related U.S. Application Data

(60) Provisional application No. 60/121,141, filed on Feb. 22, 1999, and provisional application No. 60/145,577, filed on Jul. 26, 1999.

(51) Int. Cl.⁷ .............................. G02B 6/35; G02B 6/28
(52) U.S. Cl. ........................................ 385/17; 385/24
(58) Field of Search ................................ 385/15–24, 31, 385/32, 39, 40–42; 359/115, 127, 128

(56) References Cited

U.S. PATENT DOCUMENTS

| 3,589,794 A | | 6/1971 | Marcatili |
| 5,158,908 A | | 10/1992 | Blonder et al. |
| 5,247,594 A | * | 9/1993 | Okuno et al. ............ 385/16 |
| 5,581,643 A | * | 12/1996 | Wu ............................ 385/17 |
| 5,790,583 A | | 8/1998 | Ho |
| 5,825,799 A | | 10/1998 | Ho et al. |
| 5,828,799 A | * | 10/1998 | Donald ..................... 385/16 |
| 5,878,070 A | | 3/1999 | Ho et al. |

FOREIGN PATENT DOCUMENTS

| GB | 2 210 991 A | * | 6/1989 |
| WO | WO 98/53535 | | 11/1998 |

OTHER PUBLICATIONS

Chin, M.K., S.T. Ho, "Design and Modeling of Waveguide–Coupled Single–Mode Microring Resonators", *Journal of Lightwave Technology*, vol. 16, No. 8, Aug. 1998, pp. 1433–1446.

Chu, Sai T., Brent E. Little, Wugen Pan, Taro Kaneko, Shinya Sato and Yasuo Kokubun, "An Eight–Channel Add–Drop Filter Using Vertically Coupled Microring Resonators over a Cross Grid", *IEEE Photonics Technology Letters*, vol. 11, No. 6, Jun. 1999, pp. 691–693.

Chu, Sai T., Wugen Pan, Shinya Sato, Taro Kaneko, Brent E. Little and Yasuo Kokubun, "Wavelength Trimming of a Microring Resonator Filter by Means of a UV Sensitive Polymer Overlay", *IEEE Photonics Technology Letters*, vol. 11, No. 6, Jun. 1999, pp. 688–690.

(List continued on next page.)

Primary Examiner—John D. Lee
Assistant Examiner—Michelle R. Connelly-Cushwa
(74) Attorney, Agent, or Firm—Samuels, Gauthier & Stevens, LLP

(57) ABSTRACT

Optical resonators are vertically coupled on top of bus waveguides, and are separated from the waveguides by a buffer layer of arbitrary thickness. The vertical arrangement eliminates the need for etching fine gaps to separate the rings and guides, and reduces the alignment sensitivity between the desired position of the resonator and bus waveguides by a significant degree. The resonator and bus waveguides lie in different vertical layers, and each can therefore be optimized independently. A ring resonator can be optimized for higher index contrast in the plane, small size, and low bending loss, while the bus waveguides can be designed to have lower index contrast in the plane, low propagation losses, and dimensions that make them suitable for matching to optical fibers. The waveguides can also have any lateral placement underneath the ring resonators and are not restricted by the placement of the rings. Furthermore, with the resonators lying on the top layer of the structure, they are easily accessed for tuning and trimming.

19 Claims, 13 Drawing Sheets

OTHER PUBLICATIONS

Little, B.E., S.T. Chu, W. Pan, D. Ripin, T. Kaneko, Y. Kokubun and E. Ippen, "Vertically Coupled Glass Microring Resonator Channel Dropping Filters", *IEEE Photonics Technology Letters*, vol. 11, No. 2, Feb. 1999, pp. 215–217.

Little, B.E., H.A. Haus, J.S. Foresi, L.C. Kimerling, E.P. Ippen and D.J. Ripin, "Wavelength Switching and Routing Using Absorption and Resonance", *IEEE Photonics Technology Letters*, vol. 10, No. 6, Jun. 1998, pp. 816–818.

Soref, Richard A. and Brent E. Little, "Proposed N–Wavelength M Fiber WDM Crossconnect Switch Using Active Microring Resonators", *IEEE Photonics Technology Letters*, vol. 10, No. 8, Aug. 1998, pp. 1121–1123.

"Monolithic integrationof a semiconductor ring laser and a monitoring photodetector" by Thomas Krauss et al.; Integrated Optical Circuits; 1991, SPIE, vol. 1583, pp. 150–152.

"Novel Fabrication Process for Vertical Resonant Coupler with Precise Coupling Efficiency Control" by D. V. Tishinin et al.; 1998, IEEE, pp. 93–94.

"Design and Modeling of Waveguide–Coupled Single–Mode Microring Resonators" by M.K. Chin et al; Journal of Lightwave Technology; 1998, IEEE, vol. 16, No. 8, pp. 1433–1446.

"Vertical Resonant Couplers with Precisse Coupling Effieciency Control Fabricated by Wafer Bonding" by D.V. Tishinin et al. IEEE Photonics Technology Letters; 1999, IEEE, vol. 11, No. 8, pp. 1003–1005.

"Integrated–Optic Ring Resonators with Two Stacked Layers of Silica Waveguide on Si" by Senichi Suzuki et al.; IEEE Photonics Technology Letters; 1992, IEEE, vol. 4, No. 11, pp. 1256–1258.

F.C. Blom et al., "Experimental study of integrated–optics microcavity resonators: Toward an all–optical switching device," *American Institute of Physics*, Aug. 1997, pp. 747–749.

F.C. Blom et al., "A single channel dropping filter based on a cylindrical microresonator," *Optics Communications*, 167, Aug. 15, 1999, pp. 77–82.

* cited by examiner

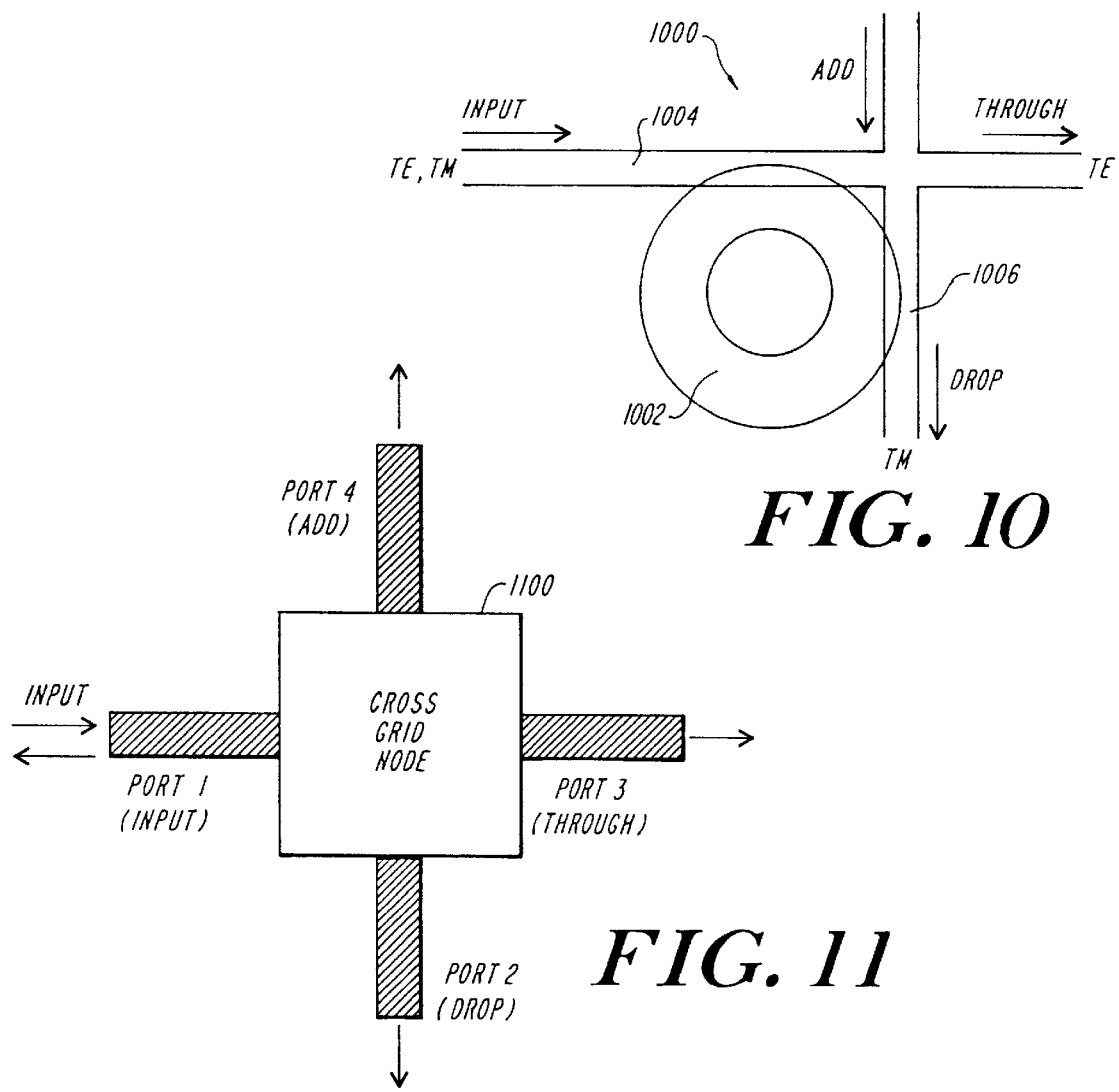
FIG. 10
FIG. 11
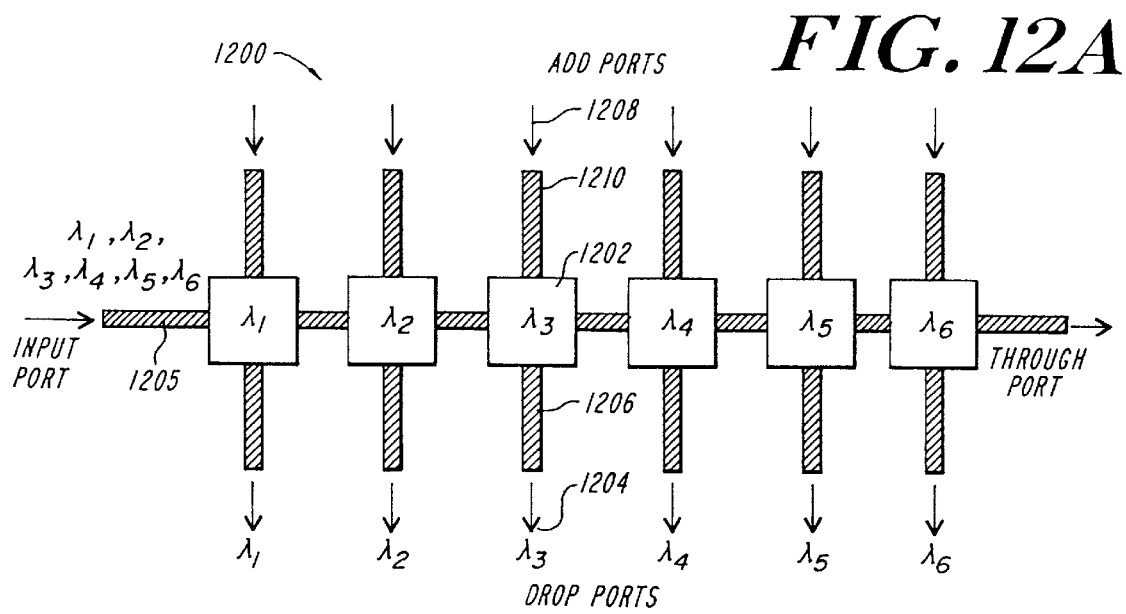
FIG. 12A

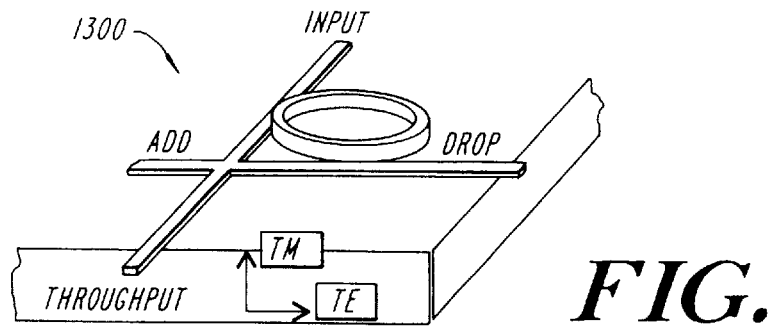
FIG. 13B
SCHEMATIC OF THE SINGLE CHANNEL
CROSS GRID VCMR ADD/DROP FILTER
FIG. 13C
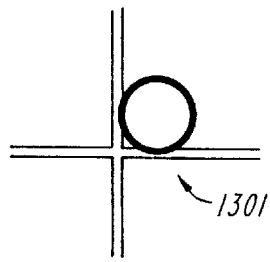
$R = 10\mu m$, $w_r = 1.5\mu m$, $w_b = 2.0\mu m$,
$t_r = 1.5\mu m$, $t_b = 0.5\mu m$, $t_{sep} = 0.6\mu m$.
THE INDEX OF THE RING AND BUS CORE IS 1.6532
AND $SiO_2$ IS USED AS SUBSTRATE.
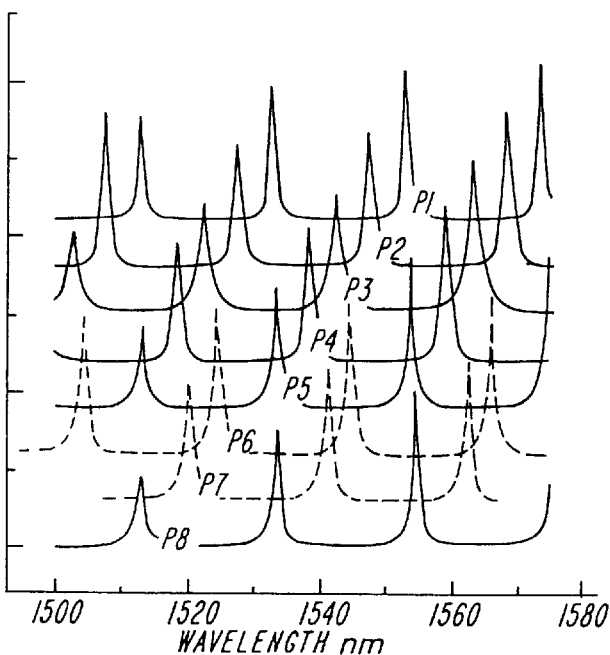
FIG. 13D
TM OUTPUT RESPONSES FROM THE 8 DROP PORTS.
NOMINAL FWHM = 1.1nm, FSR = 20.0nm

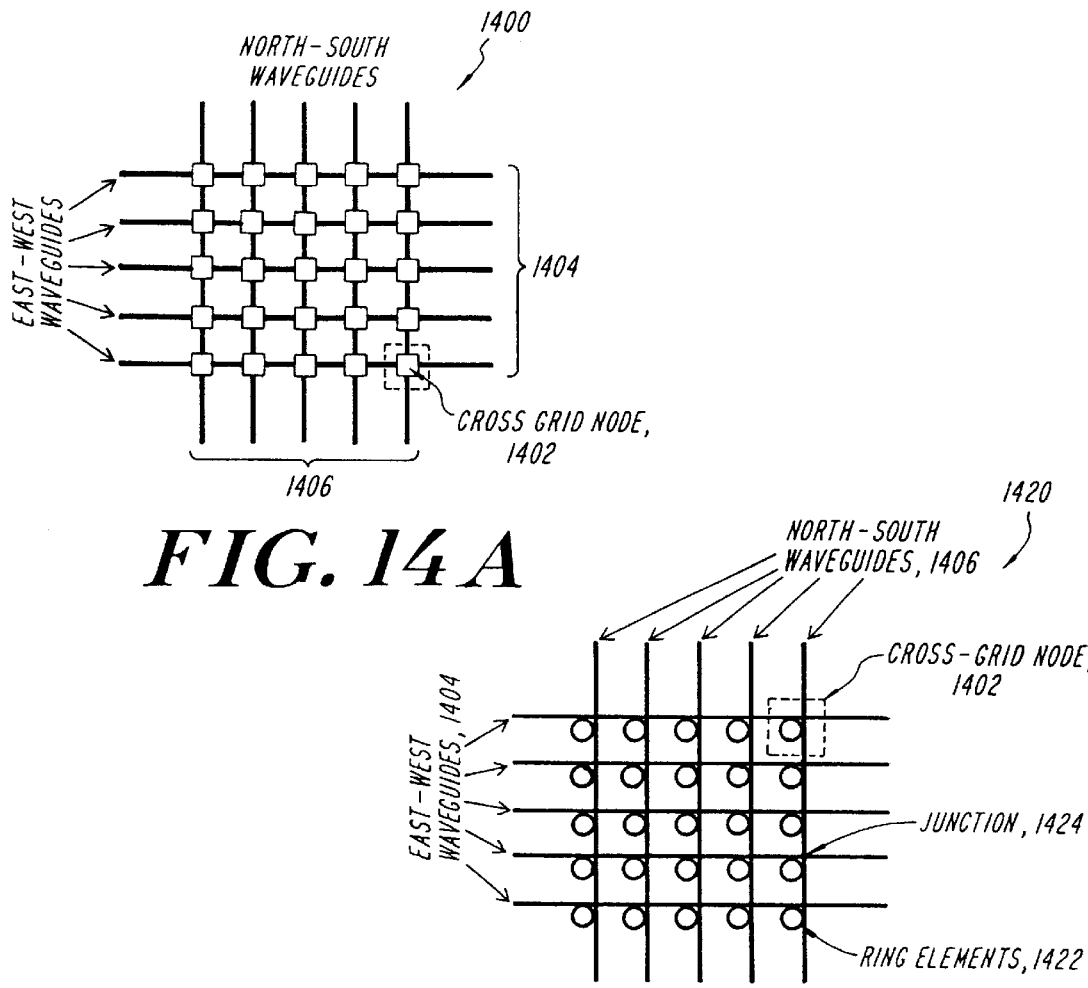
FIG. 14A
FIG. 14B
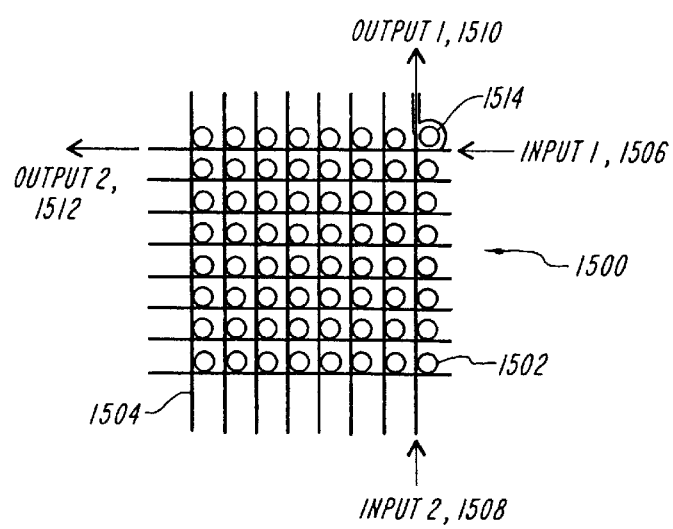
FIG. 15A

VERTICALLY COUPLED OPTICAL RESONATOR DEVICES OVER A CROSS-GRID WAVEGUIDE ARCHITECTURE

PRIORITY INFORMATION

This application claims priority from provisional applications Ser. No. 60/121,141 filed Feb. 22, 1999, and Ser. No. 60/145,577 filed Jul. 26, 1999, both of which are incorporated herein by reference in their entirety.

This invention was made with government support under Grant No. F49620-96-1-0120 awarded by the Air Force. The government has certain rights in the invention.

BACKGROUND OF THE INVENTION

The invention relates to the field of vertically coupled optical resonator devices, and in particular to vertically coupled optical resonator devices arranged over a cross-grid waveguide architecture.

Ring and disk resonators fabricated on optical substrates have been investigated theoretically and experimentally for their potential use in optical signal processing applications. It is desirable for the ring or disk dimensions to be as small as possible, so that the free spectral range of the resonances is large. Typically, such micro-resonators are a few tens of the operating wavelengths in diameter, or smaller. In order for the optical signals to be guided around a tight radius of curvature, the dielectric index contrast between the ring waveguide and the surrounding medium in the plane of the ring must be large.

Waveguides with large core/cladding index contrasts are called tightly confined waveguides. Tightly confined ring resonators have been fabricated in the $Si/SiO_2$ material system (see Little et. al. "Ultra-compact $Si/SiO_2$ micro-ring resonator channel dropping filter", IEEE Photonic. Tech. Lett., vol. 10, pp. 549–551, 1998), and the GaAs/AlGaAs material system (see Rafizadeh et. al. "Waveguide-coupled AlGaAs/GaAs microcavity ring and disk resonators with high finesse and 21.6 nm free spectral range", Opt. Lett. vol. 22, pp. 1244–1246, 1997). Larger radius rings have also been fabricated in glass (K. Oda et. al. "A wide-FSR waveguide double-ring resonator with a wide free spectral range of 100 GHz," IEEE J. Lightwave Technology, vol. 13, pp. 1766–1771, 1995). In all these structures, the rings and the waveguides that couple signals into the rings are all in the same planar layer.

FIG. 1a shows a top down view, while FIG. 1b shows a cross-sectional view, of a simplified schematic diagram of a typical planar microring resonator device 100. In this case, a ring 102 is side-coupled to a pair of bus waveguides 104, 106. This geometry is called a "laterally coupled ring". In laterally coupled microring resonators, the ring is separated from the bus waveguides by an ultra-thin etched gap 108. The resonator performance depends exponentially on the width of the gap, and is therefore affected significantly by fabrication deviations. In addition, because the ring and the bus waveguides are in the same planar layer, they are both fabricated from the same materials and have similar geometries. However, it is desirable to fabricate the bus waveguides differently than those used for the rings, so that each can be independently optimized for its particular role in the overall device.

In the conventional vertically coupled arrangement, the bus waveguides are placed above the ring, and are separated from the ring by a buffer layer. The waveguides and the ring are also buried below the surface of the chip. FIG. 2 shows a cutaway view of a simplified schematic diagram of a ring resonator device 200 having a ring resonator 202 buried below a pair of vertically coupled waveguides 204, 206. Vertical coupling of the ring to the bus reduces the sensitivity to misalignments between the two.

Furthermore, etching of very narrow gaps 208 is not required. Conventional vertically coupled rings have been fabricated in glass (see Suzuki et. al., "Integrated-optic ring resonators with two stacked layers of silica waveguide on Si", IEEE Photonic Tech. Lett., vol. 4, pp. 1256–1257, 1992). Because the ring is buried, its core-to-cladding refractive index contrast is low. In order to avoid bending induced losses, such low-index contrast rings need to have a large radius. In addition, because the ring is buried it is not easily accessible for trimming or tuning.

Vertical-type coupling has been proposed for GaAs/AlGaAs type ring resonators (Chin et al., "Design and modeling of waveguide-coupled single-mode microring resonators", IEEE J. Lightwave Technology, vol. 16, pp. 1433–1446, 1998), and also fabricated by bond-and etch back methods (Tishinin et al., "Novel fabrication process for vertical resonant coupler with precise coupling efficiency control", in LEOS 11$^{th}$ annual meeting, Institute of Electrical and Electronics Engineers, paper TuK5, 1998). In these arrangements, the bus waveguides sit on narrow pedestals, are fixed by the positions of the rings, and have other problems associated with efficient coupling to optical fibers.

One of the many desirable attributes of microresonators discussed above is that they are much smaller than other optical devices, and so many more devices can be accommodated on a single chip. Complex optical circuits can be envisioned by interconnecting hundreds to thousands of resonator devices. All microresonator devices proposed to date use high index contrast bus waveguides. Such waveguides can not physically cross through one another without considerable scattering losses and cross-talk. For these reasons, general interconnect architectures are restricted to those having non-intersecting waveguides. Only one article has addressed interconnection architectures, and it focused exclusively on the non-intersecting waveguide types, (see Soref et al., "Proposed N-wavelength M-fiber WDM crossconnect switch using active microring resonators", Photonic Tech. Lett., vol. 10, pp. 1121–1123, 1998).

SUMMARY OF THE INVENTION

In accordance with the invention, the disadvantages of prior optical resonator devices and resonator device architectures have been overcome. The resonators of the invention are vertically coupled on top of the bus waveguides, and are separated from the waveguides by a buffer layer of arbitrary thickness. This vertical arrangement eliminates the need for etching fine gaps to separate the rings and guides. It reduces the alignment sensitivity between the desired position of the resonator and bus waveguides by a significant degree. The ring and bus waveguides lie in different vertical layers, and each can therefore be optimized independently.

For example, a ring resonator can be optimized for higher index contrast in the plane, small size, and low bending loss, while the bus waveguides are designed to have lower index contrast in the plane, low propagation losses, and dimensions that make them suitable for matching to optical fibers. The waveguides can also have any lateral placement underneath the rings and are not restricted by the placement of the rings. Furthermore, with the rings lying on the top layer of the structure, they are easily accessed for tuning and trimming. Unlike vertically coupled ring resonators of the prior art, in which the ring and bus waveguides were both buried, or both air-clad, the invention seeks to have bus waveguides that are buried and ring waveguides that are air-clad.

Unlike conventional microring resonator designs, the bus waveguides in the invention can have a low core/cladding index contrast in the plane. Because of these low index contrasts, bus waveguides can now physically cross through one another without causing significant scattering loss or cross-talk on the optical signals. Waveguides that cross are essential for designing arbitrary large-scale integrated optical circuits, with which the invention is also concerned. The invention provides a means and the details for systematically constructing large-scale architectures for multi-resonator devices.

In addition, a scalable architecture using vertically coupled microring resonators above crossing waveguides is provided. The architecture consists of waveguides that cross through each other on a Manhattan-like grid pattern. Near each waveguide crossing junction, a resonator device is vertically integrated. Each ring in the architecture can perform a different signal processing function, including that of an add/drop filter, ON/OFF switch, amplitude and phase modulator, dispersion compensation, polarization rotator, polarization splitter, optical tap, to name a few.

In accordance with one exemplary embodiment, the optical resonator device of the invention includes three or more distinct layers. A micro-cavity resonator, or collection of coupled resonators, is formed in one layer. In a second layer, there is one or more bus waveguides underneath the resonators. The bus and ring layers are separated by a third layer, called a buffer layer, which can have an arbitrary thickness. Each of the layers and the waveguides within those layers can be composed of a different dielectric material. The waveguides can have any orientation in the plane of the layer, and can cross through each other at arbitrary angles. These crossings allow the entire surface of the chip to be accessed without the need to bend the bus waveguides. It also allows arbitrary optical circuits to be realized. For example, by cascading N resonator devices, a 1×N add/drop filter is easily realized for wavelength division multiplexed optical communications. An N×N array can be used for switching arrays.

BRIEF DESCRIPTION OF THE DRAWINGS

FIG. 1a shows a top view, while

FIG. 10 is a top view of a simplified schematic diagram of a polarization splitter 1000 in accordance with the invention;

FIG. 11 is a functional schematic diagram of an exemplary cross-grid node 1100 with four ports;

FIG. 12a is a functional schematic diagram of an exemplary cross-grid vector in accordance with the invention;

FIGS. 13b and 13c are a perspective view and a top view, respectively, of a simplified schematic diagram of one of the rings;

FIG. 13d is a graph of TM output responses from the 8 drop ports of the filter;

FIG. 14a is a functional schematic diagram of a cross-grid array of interconnected cross-grid nodes;

FIG. 14b is a top view of a simplified schematic diagram of an exemplary physical implementation of a cross-grid array using single ring cross connects at each junction;

FIG. 15a is a top view of a simplified schematic diagram of an exemplary realization of an, 8×8 cross-grid array of microresonators in accordance with the invention;

DETAILED DESCRIPTION OF THE INVENTION

Figure 3A:
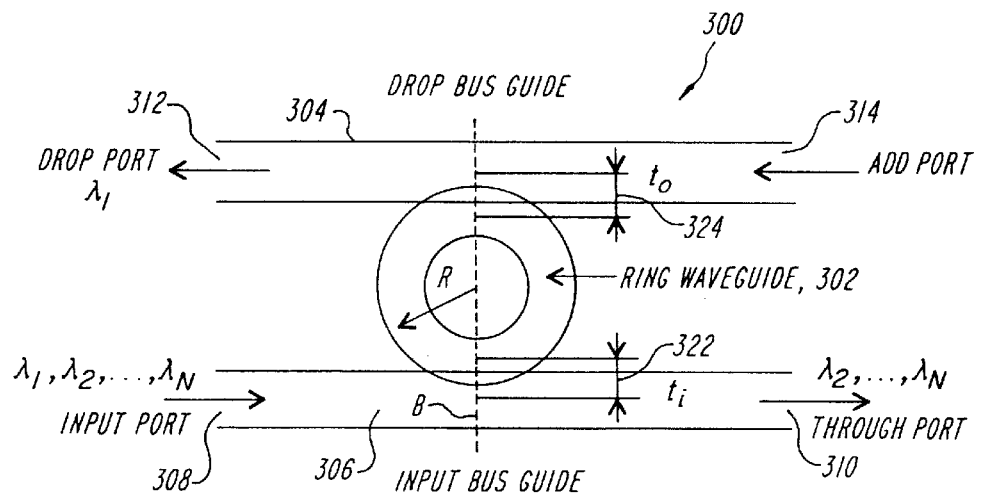
FIGS. 3a and 3b are a top view and a perspective cross-sectional view along line B, respectively, of a simplified schematic diagram of an exemplary embodiment of an optical resonator device in accordance with the invention
Figure 3B:
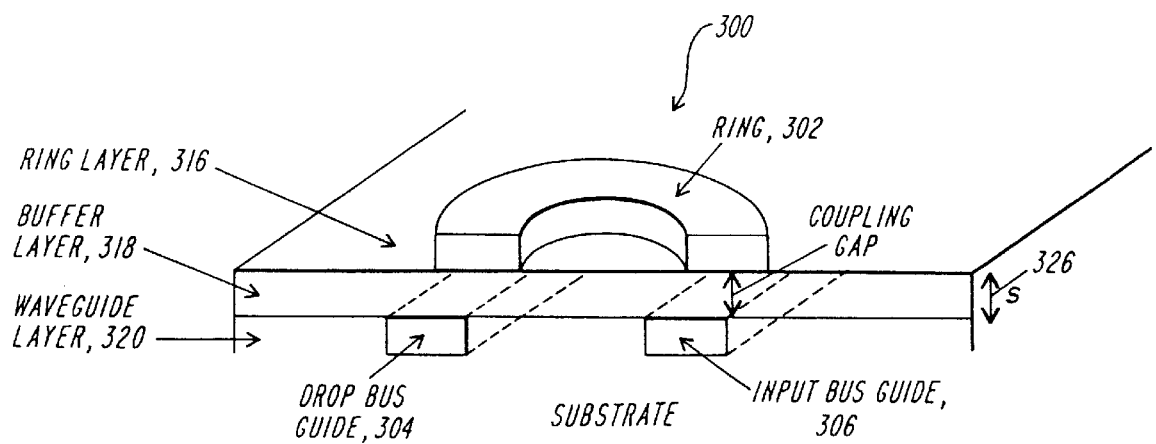

FIGS. 3a and 3b are a top view and a perspective cross-sectional view along line B, respectively, of a simplified schematic diagram of an exemplary embodiment of an optical resonator device 300 in accordance with the invention. A single ring resonator waveguide or ring 302 is vertically coupled to a pair of bus waveguides 304, 306.

Referring first to FIG. 3a, the device 300 consists of one or more rings 302, disks, racetracks, or other type of resonator. The device includes at least one bus waveguide in the proximity to the ring. The first waveguide is called the input bus waveguide 306 and has an input port 308 and a through port 310. In most, but not all, applications the device will also have a second bus waveguide in proximity to the ring. This second waveguide is called the drop bus waveguide 304, which includes a drop port 312 and an add port 314.

Referring now to FIG. 3b, the device also comprises at least three distinct layers. One of the upper layers (towards the top surface of the chip), is a ring layer 316. The ring resonator or resonators are located in this layer. Below the ring layer there is at least one buffer layer 318. The buffer layer separates the ring and bus waveguide layers. A bus waveguide layer 320, which is below the ring and buffer layers, contains the input bus waveguide, the drop bus waveguide, and possibly other waveguides. The ring layer 316, the buffer layer 318, and the waveguide layer 320 can each have an arbitrary thickness and arbitrary material contribution, and distribution. In this arrangement, the ring is said to be vertically integrated above the waveguides, or is vertically coupled above the waveguides. The ring does not need to be centered over the waveguides.

Referring back to FIG. 3a, there can be a lateral offset $t_i$ (322) between the center of the ring waveguide 302 and the center of the input bus guide 306, or an offset $t_o$ (324) between the center of the ring waveguide and the center of the drop bus guide 304. The offsets $t_i$ and $t_o$ do not necessarily have to be equal. The function of the device will dictate the size of the offsets or their ratio. The interaction strength between an optical signal in the ring waveguide, and a signal in the bus waveguide is determined by the buffer layer thickness s (326), the lateral offset ($t_i$ or $t_o$), and the details of the ring and bus waveguides such as their dimensions and material compositions.

The device 300 shown in FIGS. 3a and 3b consisting of a ring and two bus waveguides can be used as an add/drop wavelength filter. Add/drop filters are vital components of Wavelength Division Multiplexed (WDM) communications systems. A drop filter selects one wavelength channel from an input stream consisting of many channels and reroutes it to a different port from the input stream. An add filter combines a new signal channel onto an existing stream without disturbing other channels. For instance, referring to FIG. 3a, a plurality of wavelength channels $\lambda_1, \lambda_2, \ldots, \lambda_N$, is sent into the input port 308. The ring 302 is designed to select one of those wavelength, for example $\lambda_1$, which it transfers to the drop bus waveguide. The remaining channels $\lambda_2, \ldots, \lambda_N$, travel to the throughput port unaffected. The particular wavelength channel that the ring 302 selects depends on the ring radius R, and the effective index of the mode traveling in the ring waveguide. A new channel at wavelength $\lambda_1$ can be added to the input stream by applying it to the add port 314.

Figure 4A:
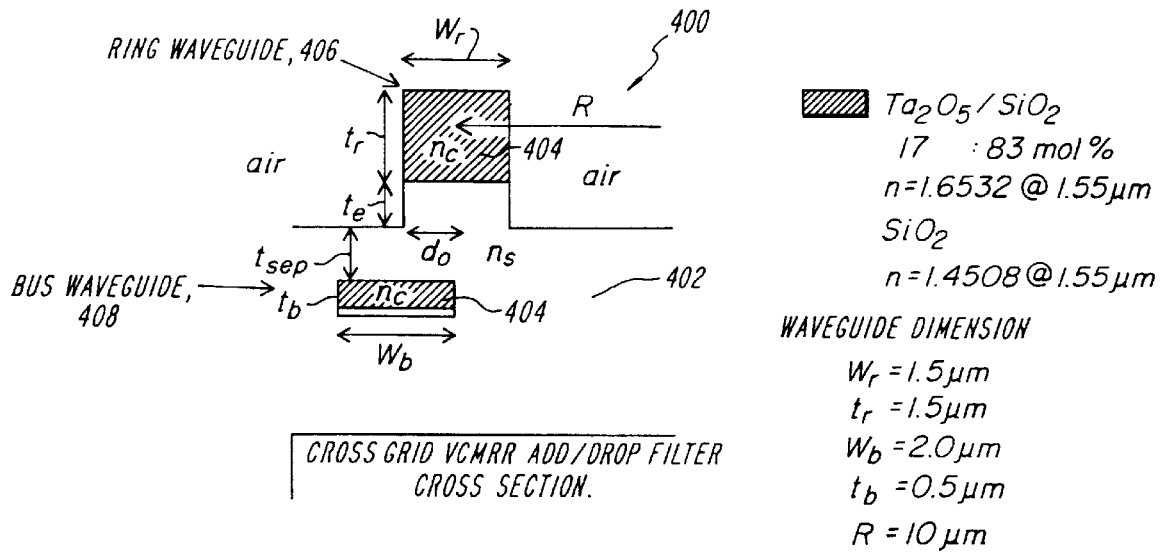
FIG. 4a is a cross-section view along part of the line B in FIG. 3a, of an exemplary fabricated single ring optical resonator device 400 in accordance with the invention.

FIG. 4a is a cross-section view along part of the line B in FIG. 3a, of an exemplary fabricated single ring optical resonator device 400 in accordance with the invention. Details of the structure geometry and materials are given in the figure. In general, both the materials and index values and dimensions can differ from those values given. The base material is $SiO_2$ having n=1.4508@ 1.55 μm. The material 404 used for the ring waveguide 406 and the bus waveguide 408 is $Ta_2O_5/SiO_2$, 17:83 mol %, with n=1.6532@ 1.55 μm. The width of the ring $W_r$ is 1.5 μm, the thickness $t_r$ is 1.5 μm, and the radius R is 10 μm. The width $w_b$ of the bus waveguide 406 is 2.0 μm and the thickness $t_b$ is 0.5 μm.

Figure 4B:
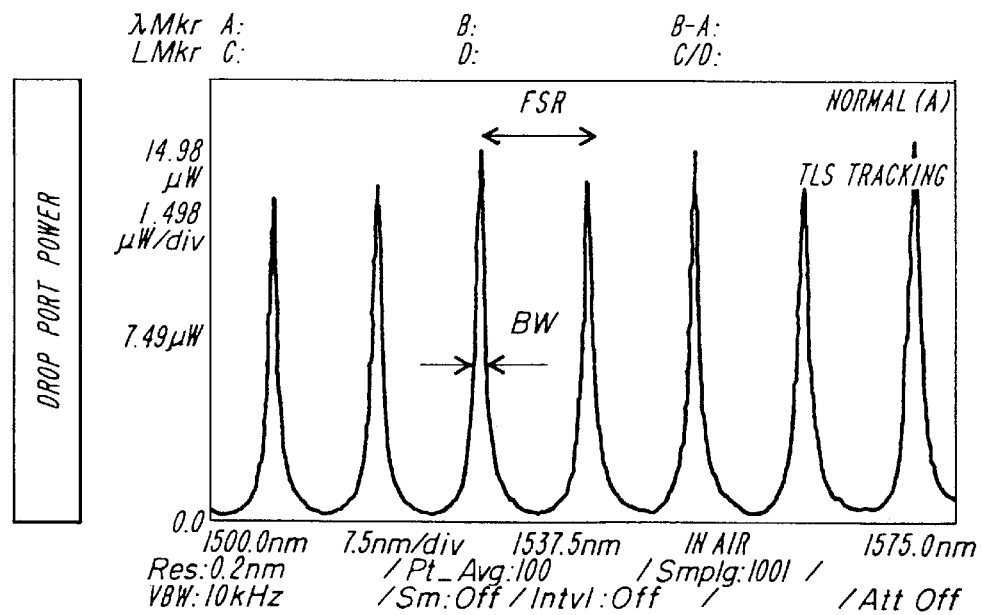
FIG. 4b is a graph showing the wavelength response observed at the drop port when signals are applied at the input port of the exemplary device.

FIG. 4b is a graph showing the wavelength response observed at the drop port when signals are applied at the input port of the exemplary resonator device in accordance with the invention. Sharp peaks are observed at the resonant wavelengths of the ring, where power is cross connected from the input bus waveguide to the drop bus waveguide. The distance between peaks is called the free-spectral range, FSR. The FSR can be made larger by decreasing the size of the rings. The bandwidth of the peaks, BW, is determined by the interaction strength between the bus waveguides and the ring waveguides, as well as on the ring radius. The BW can be reduced by increasing the thickness of the buffer layer, or by positioning the waveguides laterally farther away from the ring.

Figure 5A:
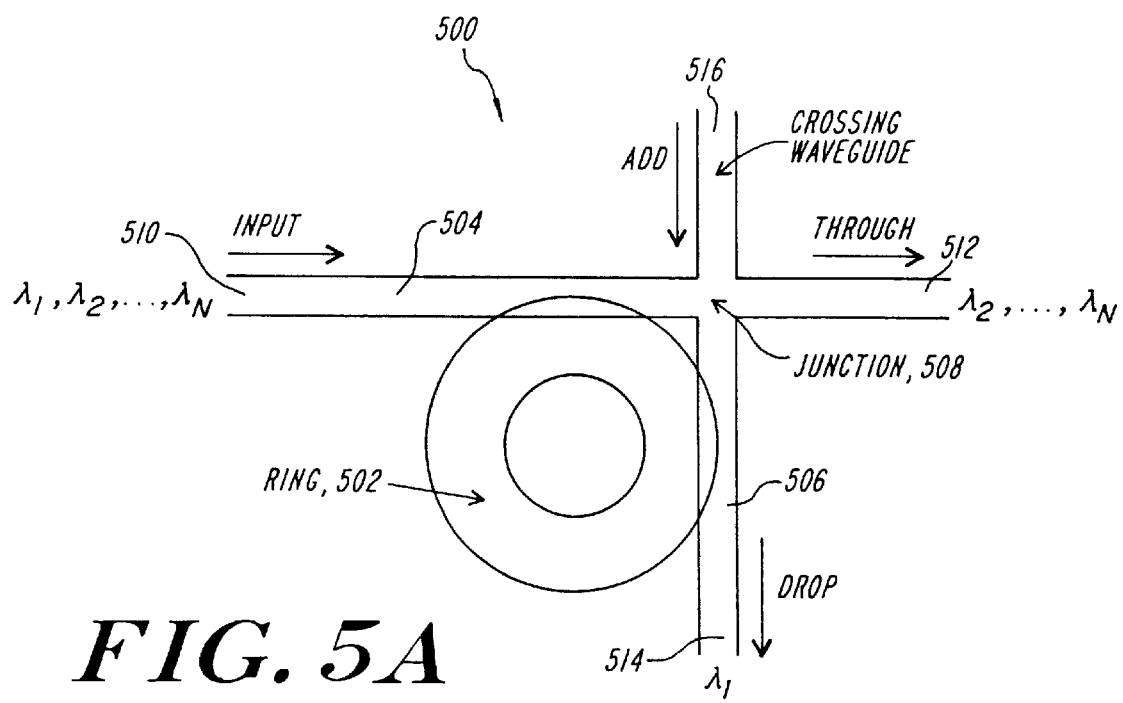
FIGS. 5a and 5b are a top view and a perspective view, respectively, of simplified schematic diagrams of an exemplary single ring optical resonator device in accordance with the invention.
Figure 5B:
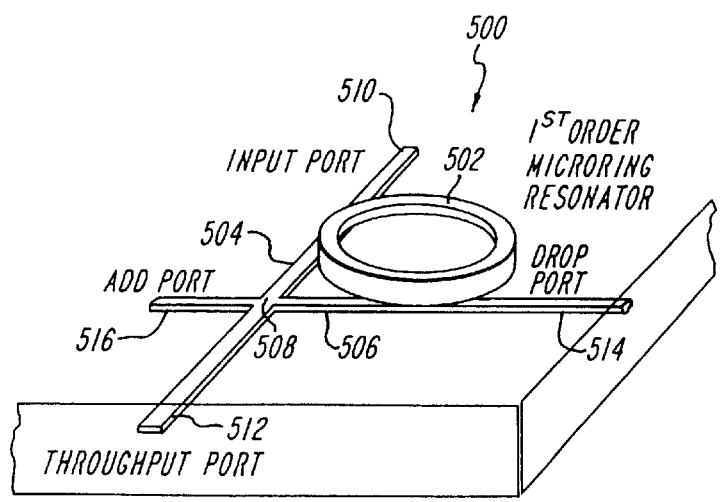

Although FIGS. 3a and 3b show a device wherein the two bus waveguides are parallel to each other, the more general case has the waveguides at arbitrary angles so that they can eventually cross through one another. FIGS. 5a and 5b are a top view and a perspective view, respectively, of simplified schematic diagrams of an exemplary single ring optical resonator device 500 in accordance with the invention. The device includes a ring resonator 502 which is vertically coupled to two waveguides 504, 506 that cross through each other at a junction 508. Although the waveguides are shown to cross each other at right angles, the crossing angle can be arbitrary. As in the parallel waveguide device of FIG. 3, the device 500 in FIGS. 5a and 5b have four ports labeled input 510, through 512, drop 514 and add 516.

Figure 1A:
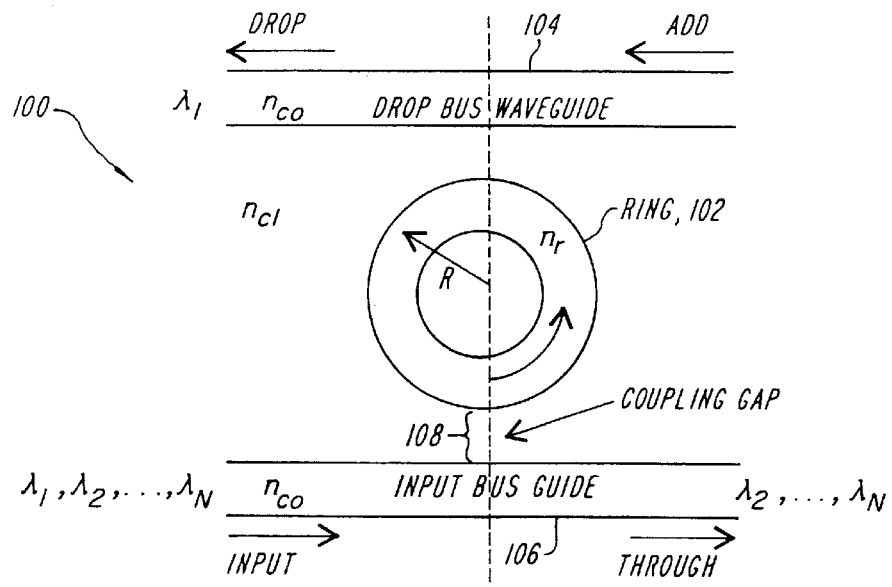
Figure 1B:
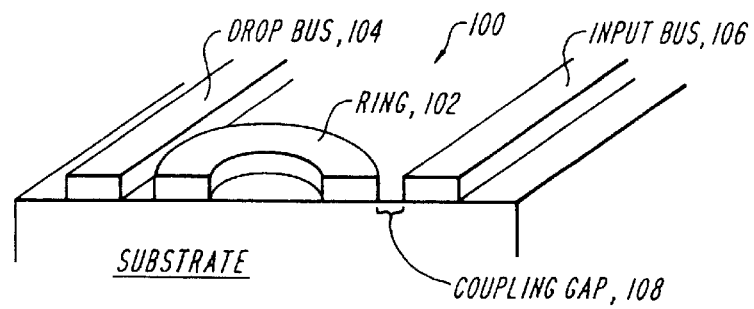
FIG. 1b shows a cross-sectional view, of a simplified schematic diagram of a typical planar microring resonator device.
Figure 2:
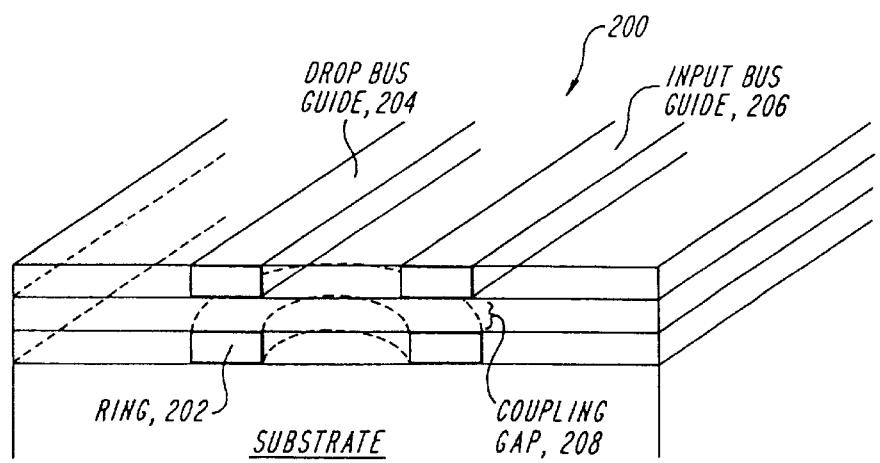
FIG. 2 shows a cutaway view of a simplified schematic diagram of a ring resonator device having a ring resonator buried below a pair of vertically coupled waveguides.

Functionally, the device 500 depicted in FIGS. 5a and 5b is an add/drop filter, identical in principle to the add/drop filter of FIGS. 3a and 3b. The device consisting of a single resonator, or multiple resonators, vertically coupled to two bus waveguides which cross, is referred to as a "cross-grid node". The magnitude of the optical signal scattering loss and scattering induced cross-talk at the junction 508, depends on the core/cladding index contrast of the bus waveguides. Scattering decreases as the core/cladding index contrast decreases. One particular advantage of the vertically coupled structure over the laterally coupled structure (of FIG. 1), is that the bus waveguides are buried below the rings and have a lower lateral index contrast (smaller core-to-cladding refractive index contrast) than the rings. They can therefore cross-through each other with low optical scattering.

Figure 6A:
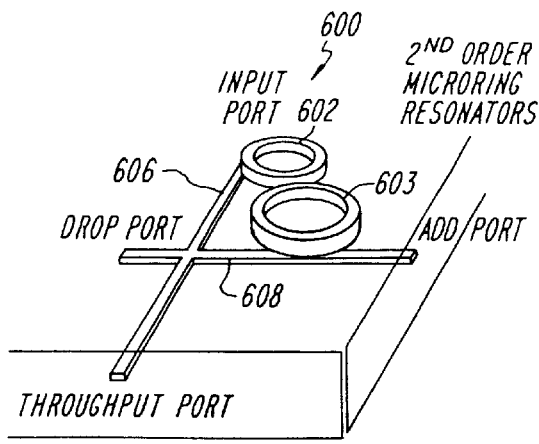
FIGS. 6a and 6b, for instance, are perspective views of simplified schematic diagrams of a $2^{nd}$ and a $3^{rd}$ order add/drop filter, respectively, using vertically coupled resonator cross-grid nodes.
Figure 6B:
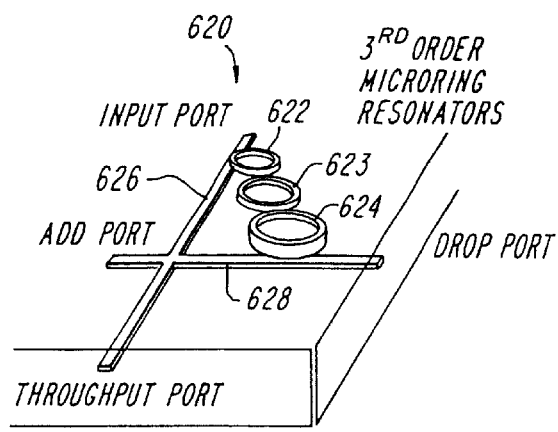

One of the desirable features of resonators is the ability to synthesize improved filter responses by coupling several resonators together. A so called $N^{th}$ order filter is one that is comprised of N resonators coupled together in some fashion. FIGS. 6a and 6b, for instance, are perspective views of simplified schematic diagrams of a $2^{nd}$ (600) and a $3^{rd}$ (620) order add/drop filter, respectively, using vertically coupled resonator cross-grid nodes. The spacing between adjacent resonators (602, 603 and 622, 623, 624), and between the resonators and the bus waveguides (606, 608 and 626,628), determines the details of the filter response (see for instance Little et al., "Micro-ring resonator channel dropping filters", in IEEE J. Lightwave Tech. Vol. 15, pp. 998–1005, 1997, incorporated herein by reference in its entirety).

Figure 7:
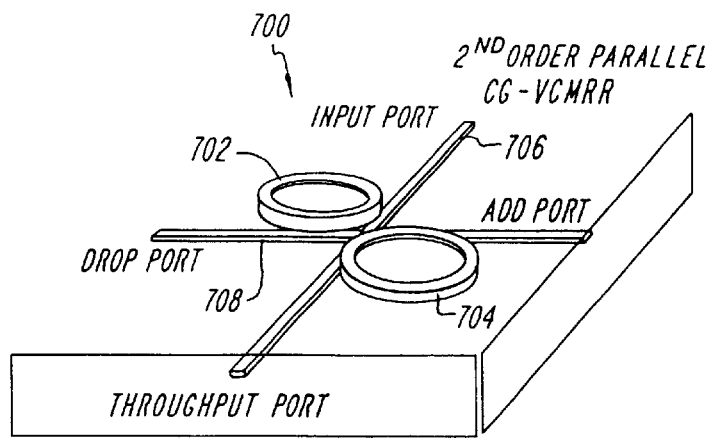
FIG. 7 is a perspective view of a simplified schematic diagram of an alternative $2^{nd}$ order filter where two adjacent ring resonators occupy the diagonals of a cross-grid node formed by intersecting bus waveguides.

FIG. 7 is a perspective view of a simplified schematic diagram of an alternative $2^{nd}$ order filter 700 where two adjacent ring resonators 702, 704 occupy the diagonals of a cross-grid node formed by intersecting bus waveguides 706, 708. The rings in FIG. 6a are laterally coupled together, but vertically coupled to the bus waveguides. Each ring may be in different layers, however, in order to take advantage of the vertical coupling between rings. For instance, the $2^{nd}$ ring 623 in the $3^{rd}$ order filter of FIG. 6b can be in the waveguide layer, while the $1^{st}$ (624) and $3^{rd}$ (622) rings are in the top layer as shown. Then, each ring will be vertically coupled to its neighboring ring, as well as to the bus waveguides. Clearly, the N$^{th}$ order filters in FIGS. 6a, 6b and 7 can also be implemented using parallel bus waveguides (such as in FIGS. 3a and 3b), rather than crossing waveguides.

Figure 8:
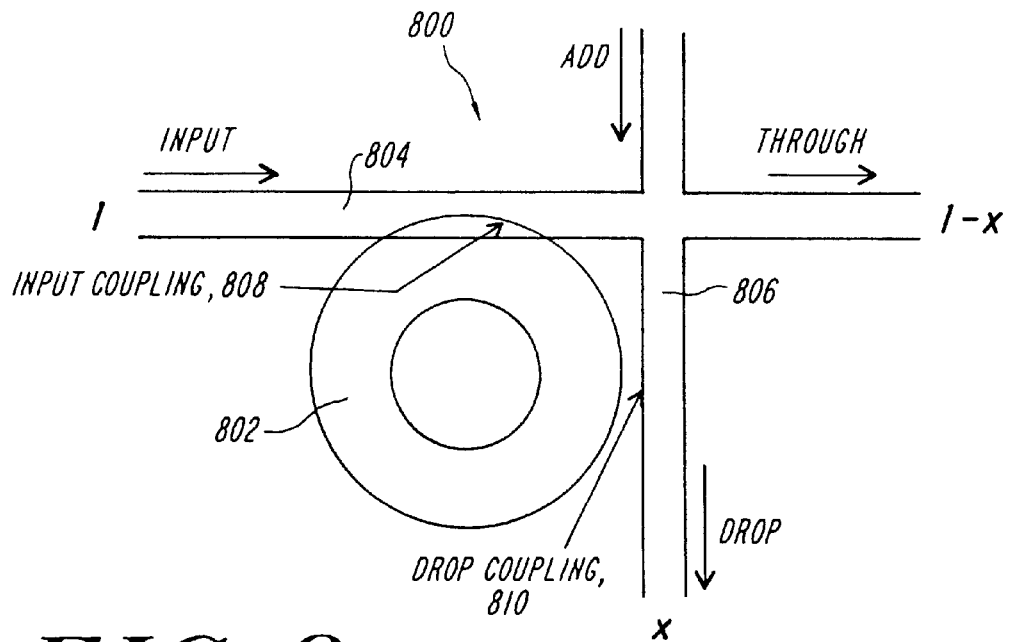
FIG. 8 is a top view of a simplified schematic diagram of a wavelength selective optical tap or signal splitter in accordance with the invention.

Devices other than add/drop filters, using the single or multiple ring cross-grid node, can be considered. For example, FIG. 8 is a top view of a simplified schematic diagram of a wavelength selective optical tap or signal splitter 800 in accordance with the invention. The signal splitter includes a ring resonator 802 adjacent intersecting bus waveguides 804, 806. In the signal splitter 800, only part of the input to the bus waveguide 804 is redirected to the drop port of bus waveguide 806, while the remainder goes to the through port. For example, if a signal with power of 1 is input, the fraction x goes to the drop port, and the remainder 1−x goes to the through port. The splitting ratio is adjusted by the ratio of input coupling (as at 808) to drop coupling (as at 810). These coupling strengths can be adjusted by changing the lateral spacing between the ring and each bus guide, as shown in the figure.

Figure 9:
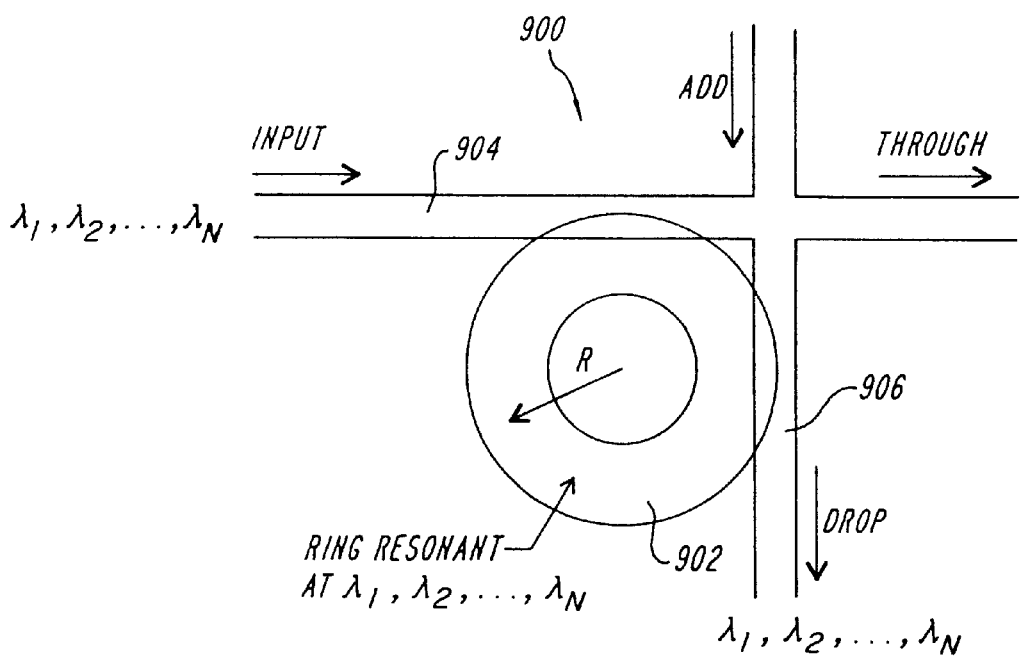
FIG. 9 is a top view of a simplified schematic diagram of an optical resonator device that serves as a sharp bend mechanism in accordance with the invention.

A cross-grid node with a very large ring can serve as a sharp bend, rerouting all input wavelength channels to the drop port of a bus waveguide. FIG. 9 is a top view of a simplified schematic diagram of an optical resonator device 900 that serves as a sharp bend mechanism in accordance with the invention. The device 900 includes a ring resonator 902 adjacent intersecting bus waveguides 904, 906. The radius R of the ring is chosen large enough so that the free spectral range (FSR) corresponds to the signal channel spacing in a WDM system. Therefore, all equally spaced channels will be selected by the ring.

A cross grid node can also act as polarization splitters. A polarization splitter redirects the two orthogonal polarizations of the input waveguide to two separate outputs. FIG. 10 is a top view of a simplified schematic diagram of a polarization splitter 1000 in accordance with the invention. The splitter 1000 includes a ring resonator 1002 adjacent intersecting bus waveguides 1004, 1006. The splitter 1000 reroutes the TM (transverse magnetic) polarization to the drop port, and the TE (transverse electric) polarization to the through port. A resonator can accomplish this task because the resonant condition can be made polarization selective by designing the ring waveguide appropriately.

All resonator devices can be switched ON or OFF by absorption. In the absence of absorption, the devices work ideally as described previously. On the other hand, with large absorption induced in or near the ring, resonance is suppressed and the input signal does not interact with the resonator device. In other words, the device is switched OFF (see Little et al., "Wavelength switching and routing using absorption and resonance", Photonic Tech. Lett., vol. 10, pp. 816–818, 1998, incorporated herein by reference in its entirety).

The interconnection of multiple cross-grid nodes into larger scale arrays is now described. FIG. 11 is a functional schematic diagram of an exemplary cross-grid node 1100 with four ports labeled port 1, port 2, port 3, and port 4. These ports are the same ports labeled input, through, drop, and add, previously described with reference to FIGS. 3a, 3b and 4. The cross-grid node can be any of the single or multiple ring devices previously described in conjunction with FIGS. 3 through 10.

A linear connection of cross-grid nodes is referred to herein as a "cross-grid vector". FIG. 12a is a functional schematic diagram of an exemplary cross-grid vector 1200 in accordance with the invention. This type of device may serve as a compact 1×N wavelength add/drop filter, for instance. Each of a plurality of cross-grid nodes 1202 in the vector 1200 selects one particular wavelength channel 1204 from an input bus waveguide 1205 and cross connects it the corresponding drop port 1206. It is also possible to add a new wavelength channel to the input bus waveguide by applying that channel 1208 to the appropriate add port 1210 of one of the cross-grid nodes 1202.

Figure 12B:
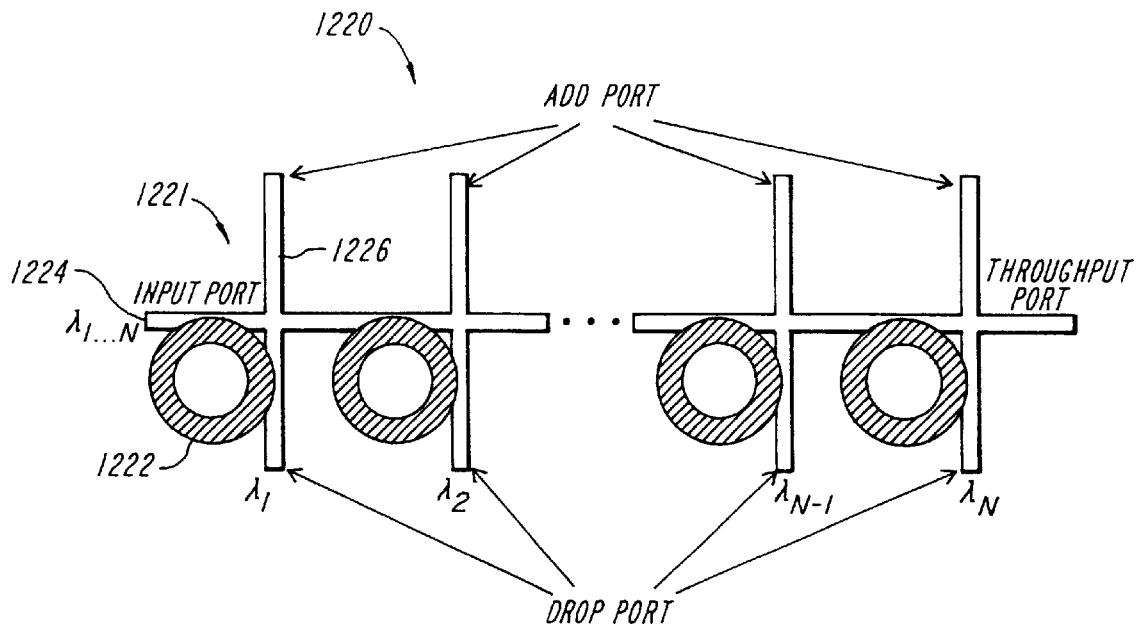
FIG. 12b is a top view of a simplified schematic diagram of a physical implementation of a 1×N cross-grid vector using single ring resonator channel dropping filters.

FIG. 12b is a top view of a simplified schematic diagram of a physical implementation of a 1×N cross-grid vector 1220 using single ring resonator channel dropping filters 1221 each having a ring resonator 1222 vertically coupled to an input bus waveguide 1224 and an output bus waveguide 1226. The wavelength selected by any particular ring depends on the radius of the ring and the effective index of the ring waveguide.

Figure 13A:
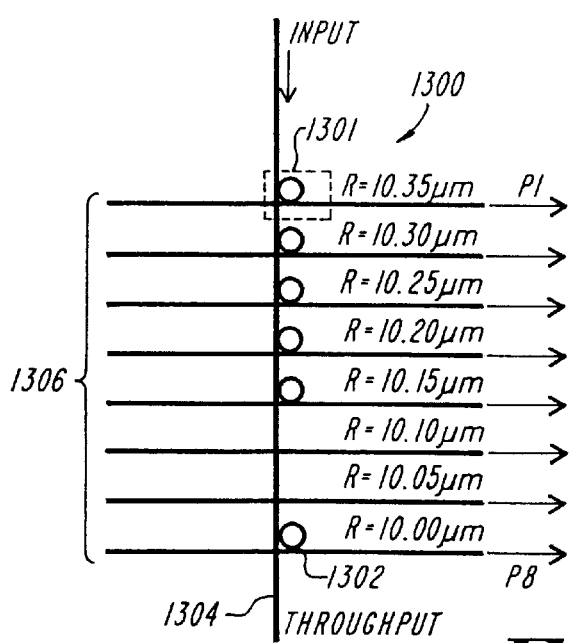
FIG. 13a is top view of a simplified schematic diagram of an experimental realization of an 8 channel add/drop filter using the vertically coupled microring resonator cross-grid vector arrangement in accordance with the invention.

FIG. 13a is top view of a simplified schematic diagram of an experimental realization of an 8 channel add/drop filter 1300 using the vertically coupled microring resonator cross-grid vector arrangement in accordance with the invention. The filter 1300 includes optical ring resonators 1301 arranged at the intersections of an input waveguide 1304 and a plurality of drop waveguides 1306. FIGS. 13b and 13c are a perspective view and a top view, respectively, of a simplified schematic diagram of one of the rings is shown. The details of the ring geometry and materials are the same as that described with reference to FIG. 4a. As shown, the radii R of the rings range from 10.00 $\mu$m to 10.35 $\mu$m, $w_r$=1.5 $\mu$m, $w_b$=2.0 $\mu$m, $t_r$=1.5 $\mu$, $t_b$=0.5 $\mu$m, and $t_{sep}$=0.6 $\mu$m. The index of the ring and bus core is 1.6532 and $SiO_2$ is used as the substrate.

In the 1×8 filter, each ring has a slightly different radius so that it will select a different wavelength. The smallest ring 1302 has a radius of 10 $\mu$m, while the remaining rings increase in radius by steps of 50 nm. Here, the 50 nm increments in ring radius lead to a spacing between wavelength channels of 5.7 nm. Smaller channel spacings are achieved by smaller incremental changes of radius. FIG. 13d is a graph of TM output responses from the 8 drop ports of filter 1300. The spectrum for each port is shown superimposed on the graph.

A two-dimensional interconnection of cross-grid nodes is referred to as a "cross-grid array". FIG. 14a is a functional schematic diagram of a cross-grid array 1400 of interconnected cross-grid nodes 1402. The array is laid out on a Manhattan-grid pattern, comprising East-West 1404 and North-South 1406 running waveguides. The junction of two intersecting waveguides consists of a cross-grid node 1402. The cross-grid node may include any single or multiple ring device discussed in conjunction with FIGS. 3–10. The node might also include no ring device, and simply be a crossing of two waveguides.

Although FIG. 14a shows the East-West and North-South running waveguides as being at right angles to one another, they can be at arbitrary angles for any given waveguide, and all waveguides can be different. Furthermore, the number of East-West running waveguides does not need to be the same as the number of North-South running waveguides. The cross-grid vector 1200 of FIG. 12a is a special case of the more general cross-grid array.

FIG. 14b is a top view of a simplified schematic diagram of an exemplary physical implementation of a cross-grid array 1420, using single ring cross connects 1422 at each junction 1424. The rings may be vertically coupled above the waveguide array. If the response of the rings can be controlled electrically (through electro-optic, electroabsorptive, temperature, optical pumping, mechanical, or other mechanisms), the cross-grid array would be a very compact switching node, if the rings are made tunable or switchable.

FIG. 15a is a top view of a simplified schematic diagram of an exemplary realization of an 8×8 cross-grid array 1500 of microresonators in accordance with the invention. The array utilizes single ring configurations. Each ring 1502 in the array is different from all others, and so each has its own unique wavelength response. The rings are vertically integrated above the cross-grid waveguide array 1504.

Figure 15B:
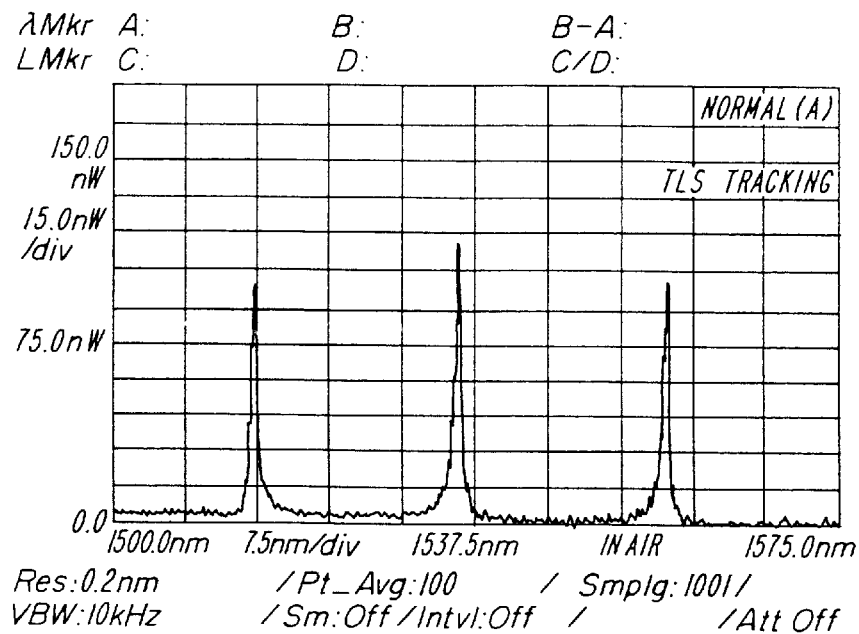
FIGS. 15b and 15c are graphs of measured data at output 1 and output 2 of the array, respectively.
Figure 15C:
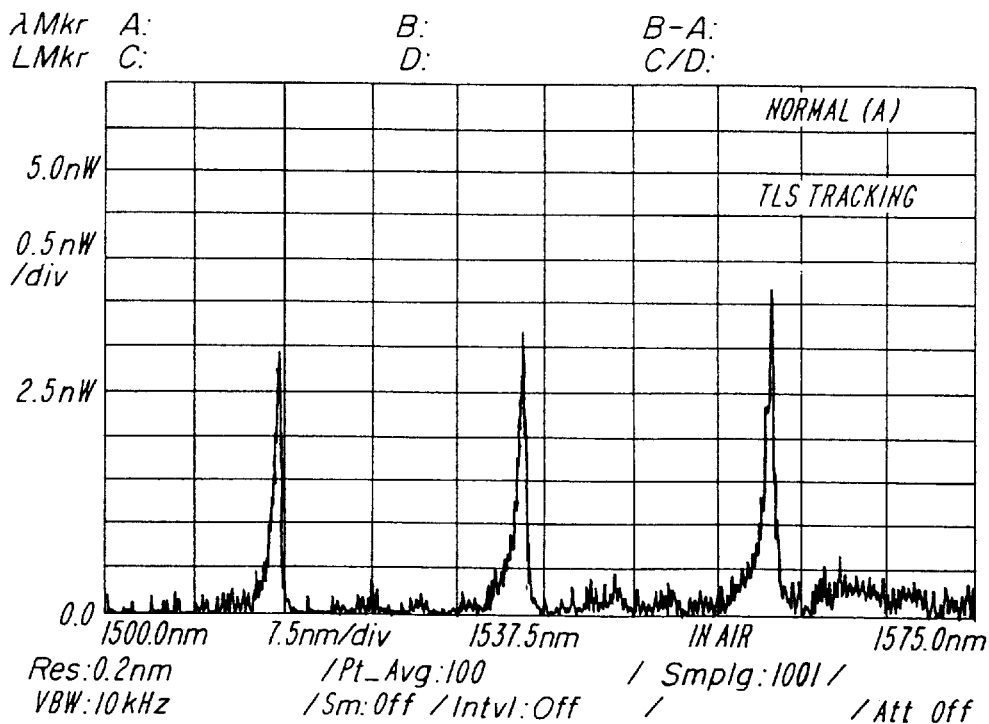

FIGS. 15b and 15c are graphs of measured data at output 1 (1510) and output 2 (1512) of the array 1500, respectively. The data shows that power can be cross-connected through the array. For example, input 1 (1506) is cross-connected to output 1 (1510) by ring 1514. The ring 1514 also cross-connects input 2 (1508) to output 2 (1512). The signal at input 2 must traverse through fourteen other junctions and rings before appearing at output 2. Nonetheless, the measured data at output 2 shows almost identical response to that at output 1, and proves that the array can have low scattering loss.

Tuning and trimming methods, as well as tuning arrays are now described. Trimming is distinguished from tuning in that trimming is considered a one-time, permanent change to the post fabricated device characteristics. For example, after fabrication a device might not resonate at the desired wavelength because of uncertainties in fabrication, materials, or design. In order to correct for undesired variations, the physical characteristics of the ring or rings need to be modified. One may, for instance, remove material from the ring by means of laser ablation.

Figure 16:
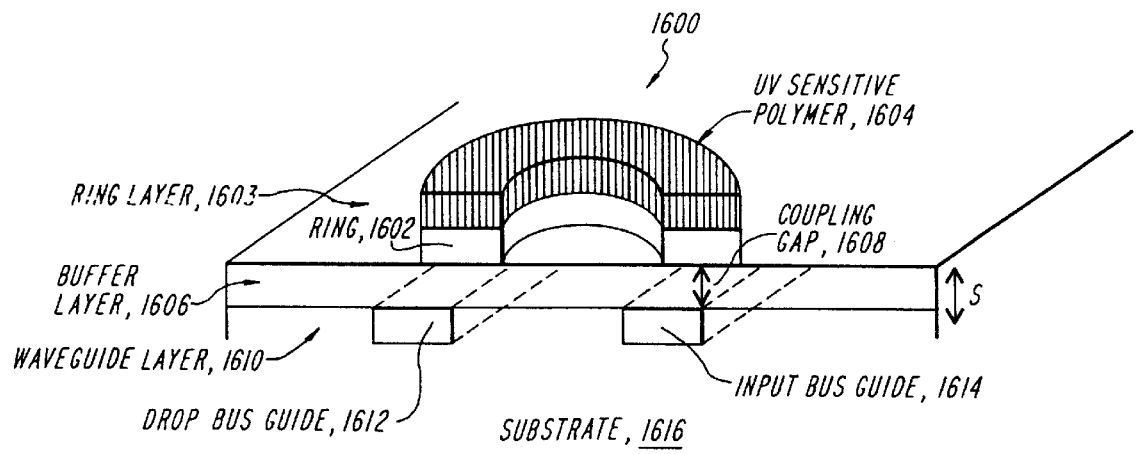
FIG. 16 is a perspective cross-section view of a simplified schematic diagram of a UV sensitive device in accordance with the invention.

Another trimming method is to deposit a UV sensitive material selectively on top of the rings or over the entire chip surface. With exposure to UV radiation, the refractive index of the material changes. The amount of change depends on the UV sensitive material, as well as on the UV dosage. FIG. 16 is a perspective cross-section view of a simplified schematic diagram of a UV sensitive device 1600 in accordance with the invention. The device includes a UV sensitive polymer or UV sensitive material layer 1604 deposited on top of the ring waveguide 1602, which is configured in a ring layer 1603. The ring waveguide itself might be fabricated from UV sensitive materials. The UV trimming of rings has recently been demonstrated (see Chu et al., "Wavelength trimming of a microring resonator filter by means of a UV sensitive polymer overlay", IEEE Photonics Tech. Lett., vol. 11, pp. 688–690, 1999, incorporated herein by reference in its entirety). The device includes a buffer layer 1606 that defines a coupling gap 1608, and a waveguide layer 1610 in which a drop bus waveguide 1612 and an input bus waveguide 1614 are configured. A substrate 1616 such as $SiO_2$ is utilized.

Tuning implies an active and reversible change in the ring resonator characteristics. For example, it may be desirable to electrically change the refractive index of the ring because this leads to a change in the resonant wavelength. A tunable filter is very desirable because it allows variability in the wavelength or selected channel. Tuning also serves the role of trimming.

Tuning involves changing the refractive index or the absorptive constant of the ring resonator, or of the surrounding material. A change in index can be induced by changes in temperature, electric fields, magnetic fields, free carrier concentrations, electronic bandgap modifications, material stress, piezoelectric effects, optical activation, or by mechanical means, among other possible methods. Appropriate materials that manifest any of the characteristics listed must be selected. Temperature tuning for instance, can involve a localized heater (resistive electrode) placed above or below each ring, or surrounding the ring on the surface of the chip.

Figure 17:
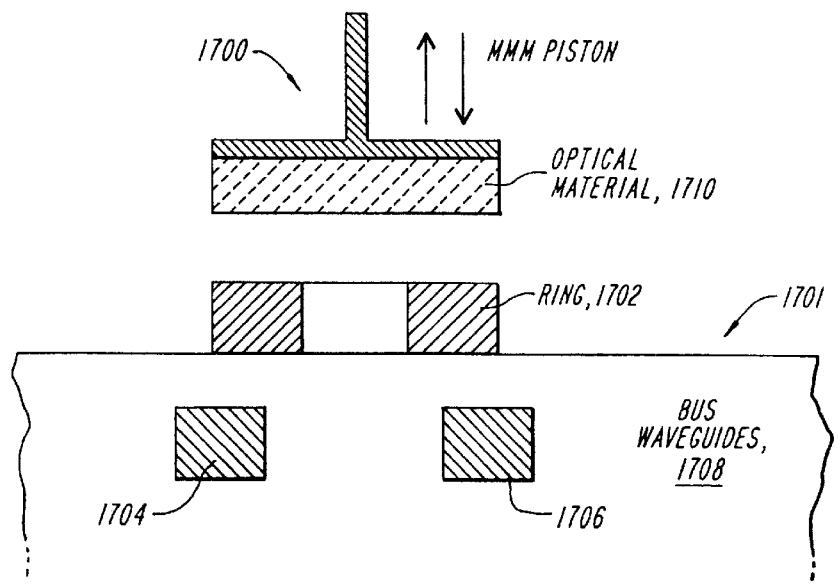
FIG. 17 is a simplified functional schematic diagram of a mechanical tuning technique in accordance with the invention.

FIG. 17 is a simplified functional schematic diagram of a mechanical tuning technique in accordance with the invention. Mechanical tuning, for example, can involve positioning a tuning piston 1700 above a ring 1702 of a ring resonator device 1701. The ring 1702 is vertically coupled to buried bus waveguides 1704, 1706 within a substrate 1708. An optical material 1710 is attached to the piston 1700, and the piston varies the proximity between the material and the ring resonator 1702. The effect on the optical material 1710 depends on the degree of proximity with the ring 1702.

Generally, transparent materials placed on the piston result in a change in the effective index of the mode in the ring waveguide. If the optical material on the piston has the same refractive index as the ring, or is larger, optical power in the ring can be transferred to the optical material, resulting in loss. The piston can be positioned by a microcontroller, such as a micro-electronic machine (MEM). It can also be a membrane, movable by means of an electrostatic field, or by piezoelectric means.

Electric fields and electric currents (charge carriers), can also affect the refractive index and/or the absorption. Electric fields can be induced across the ring region by a number of means. For example, the field can be applied laterally across the ring by electrodes on either side of the ring. Alternatively, electrodes can be placed on top of the ring and on the bottom of a doped substrate. In most cases, the electrodes have to be isolated from the optical mode in the ring to not incur absorption. The electrodes can be isolated by placing them far enough from the optical mode, or by depositing buffer material between the electrodes and the ring.

Figure 18A:
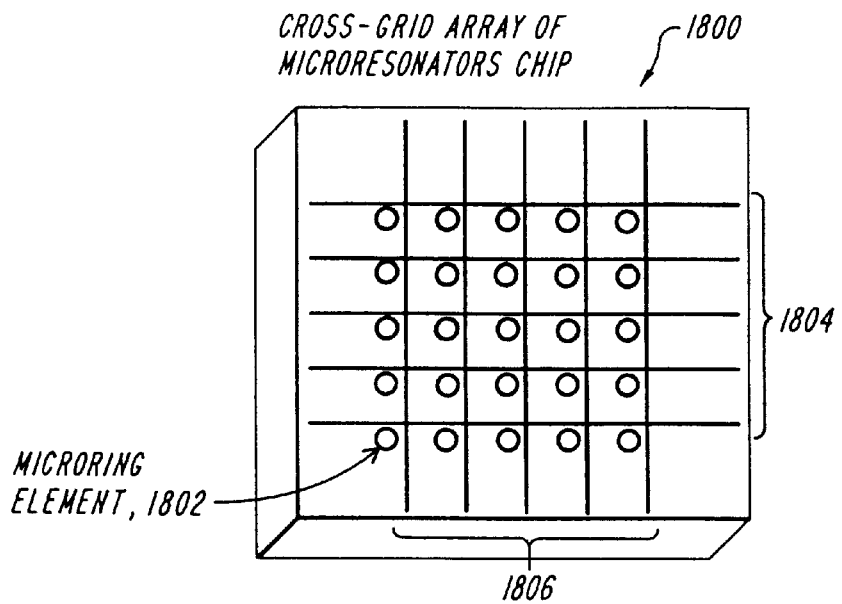
FIGS. 18a and 18b are simplified schematic diagrams of flip chip tuning arrays in accordance with the invention.
Figure 18B:
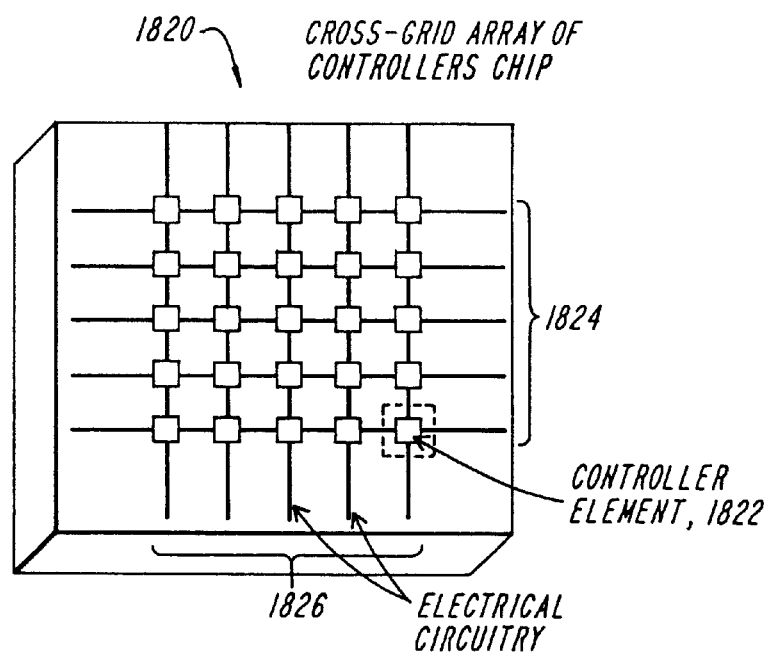

FIGS. 18a and 18b are simplified schematic diagrams of flip chip tuning arrays in accordance with the invention. Two distinct chips are used in the flip chip arrangement. One chip contains a cross-grid array 1800 of microresonators 1802 arranged at the junctions of intersecting waveguides 1804, 1806. The second chip contains the electronically activated array 1820 of controller elements 1822 arranged at the junctions of intersecting electrical lines 1824, 1826. The controllers can be electrodes for voltage or current application, heater pads, VCSELs (vertically coupled surface emitting lasers), MEM pistons, or other tuning related devices.

The position of the controller elements 1822 matches the positions of the microresonators 1802, so that when the two chips are sandwiched together face-to-face, there is an electrical control element above each resonator or collection of resonators. There can also be a buffer layer on top of the rings to isolate the controller from the optical mode, if necessary. The advantage of the flip-chip arrangement is that the two chips are optimized independently. The resonator chip is optimized for optical functionality, while the electrical chip is optimized for the electronics, the heat dissipation, the control of MEMs etc. Each chip uses the most appropriate material for its respective functions.

In all the devices described herein, the ring resonators were fabricated on top of the optical chip as a unit. The ring resonators can also be separate devices which are mechanically placed over the cross-grid nodes. For instance, rings can be placed on a micro-positioner MEMs piston similar to the one shown FIG. 17. The ring can be lowered onto the chip surface, or raised away from it. The ability to lower or raise the rings represents a true ON/OFF switch, since the wavelength selective element (ring) is either in the optical circuit (interacting with the bus waveguides), or it is disconnected from the optical circuit. The ring need be only raised 1 μm–5 μm away from the chip surface to be effectively disconnected from the circuit.

Although the present invention has been shown and described with respect to several preferred embodiments thereof, various changes, omissions and additions to the form and detail thereof, may be made therein, without departing from the spirit and scope of the invention.

What is claimed is:

1. An optical resonator device comprising:

least one input waveguide;

at least one output waveguide which intersects said at least one input waveguide at a junction;

an optical resonator arranged at said junction so as to be optically coupled to both said input and output waveguides.

2. The device of claim 1, wherein said input and output waveguides are arranged in a first layer below a second layer in which said optical resonator is arranged.

3. The device of claim 2, further comprising a buffer layer configured between said first and second layers so as to provide a vertical gap between said optical resonator and said waveguides.

4. The device of claim 3 further comprising at least one additional optical resonator arranged in a third layer above said first layer and spaced apart from said second layer.

5. The device of claim 1, wherein said waveguides comprise a smaller core-to-cladding refractive index contrast index contrast than said optical resonator.

6. The device of claim 1, wherein said optical resonator comprises at least one ring resonator.

7. The device of claim 6, wherein said optical resonator comprises a single ring resonator to operate a single order filter.

8. The device of claim 6, wherein said optical resonator comprises N ring resonators so as to be operable as an Nth order filter.

9. The device of claim 1, wherein a plurality of output waveguides intersect a single input waveguide to define a cross-grid vector.

10. The device of claim 1 further comprising an array of resonator nodes, each node including an optical resonator arranged at an intersection junction of one of a plurality of input waveguides and an associated one of a plurality of output waveguides to define a cross-grid array.

11. The device of claim 1, wherein said optical resonator is tuned by changing the refractive index or absorptive constant of said optical resonator.

12. The device of claim 11, wherein said refractive index or absorptive constant of said optical resonator are changed by varying temperature, electric fields, magnetic fields, free carrier concentrations, electronic bandgap, material stress, piezoelectric effects or optical activation.

13. The device of claim 11, wherein said optical resonator is tuned by providing a UV sensitive material layer on said optical resonator.

14. The device of claim 11, wherein said optical resonator is tuned by mechanically variably positioning an optical material layer with respect to said optical resonator.

15. The device of claim 1, wherein said optical resonator is mechanically variably positioned with respect to said waveguides.

16. The device of claim 1, wherein said optical resonator is configured so as to be operable as a wavelength filter.

17. The device of claim 1, wherein said optical resonator is configured so as to be operable as an add/drop filter.

18. The device of claim 1, wherein said optical resonator is configured so as to be operable as a polarization splitter.

19. The device of claim 1, wherein said optical resonator is configured so as to be operable as a polarization rotator.

* * * * *

UNITED STATES PATENT AND TRADEMARK OFFICE
CERTIFICATE OF CORRECTION

| | | |
|---|---|---|
| PATENT NO. | : 6,411,752 B1 | Page 1 of 1 |
| APPLICATION NO. | : 09/510432 | |
| DATED | : June 25, 2002 | |
| INVENTOR(S) | : Little et al. | |

It is certified that error appears in the above-identified patent and that said Letters Patent is hereby corrected as shown below:

IN THE SPECIFICATION

Please replace the following sponsorship information at column 1, line 11:

This invention was made with government support under Grant No. F49620-96-1-0126 awarded by the Air Force. The government has certain rights in this invention.

Signed and Sealed this

Twenty-first Day of June, 2011

David J. Kappos
*Director of the United States Patent and Trademark Office*